United States Patent [19]
Saurer

[11] 4,140,372
[45] Feb. 20, 1979

[54] PASSIVE ELECTRO-OPTIC DISPLAY CELL AND METHOD FOR ITS MANUFACTURING

[75] Inventor: Eric Saurer, Neuchâtel, Switzerland

[73] Assignee: Ebauches S.A., Neuchatel, Switzerland

[21] Appl. No.: 808,658

[22] Filed: Jun. 21, 1977

[51] Int. Cl.² .................................................. G02F 1/13
[52] U.S. Cl. ...................................... 350/336; 350/339
[58] Field of Search ................................. 350/336, 339

[56] References Cited
U.S. PATENT DOCUMENTS

| | | | |
|---|---|---|---|
| 3,736,047 | 5/1973 | Gelber et al. | 350/338 |
| 3,832,034 | 8/1974 | Edmonds | 350/339 |
| 3,989,353 | 11/1976 | Phalan | 350/336 |

*Primary Examiner*—Edward S. Bauer
*Attorney, Agent, or Firm*—Silverman, Cass & Singer, Ltd.

[57] ABSTRACT

An electro-optic passive display cell with a transparent plate having an inner face and a transparent electrically insulating coating applied to said inner face. Electrically conductive electrodes and leads are formed in the coating by ion implantation. The coating is electrically insulating within the cell except in the locations in which said electrodes and leads are formed.

12 Claims, 2 Drawing Figures

PASSIVE ELECTRO-OPTIC DISPLAY CELL AND METHOD FOR ITS MANUFACTURING

BACKGROUND OF THE INVENTION

The present invention relates to a passive electro-optic display cell comprising at least a plate made of transparent material carrying, on its inner face, electrodes and conductive tracks or leads.

The invention relates also to a method of manufacturing of the above mentioned display cell.

The electro-optic passive display cells of the type hereabove mentioned have the drawback that the electrodes and the conductive tracks are visible through the plate of transparent material depending on the angle of incidence of observation, that is due to the fact that the index of refraction of the conductive coating is not the same as the index of refraction of the active constituent which occupies the interstices between the electrodes and the conductive tracks or leads. Hence interference phenomena are produced which render visible the electrodes and the conductive tracks or leads even when the display cell is at rest.

The object of the present invention is to remove these drawbacks.

SUMMARY OF THE INVENTION

To this effect, the display cell according to the invention is characterized by the fact that its electrodes and conductive tracks or leads are part of a transparent insulating coating applied on the inner face of the transparent plate, having the same index of refraction and the same thickness as the said electrodes and conductive tracks or leads.

The method of manufacturing of this cell is characterized by the fact that one applies on the plate of transparent material a transparent insulating coating, then dopes the said insulating coating by a ionic implantation in the areas intended to constitute the electrodes and the conductive tracks or leads, so as to render these areas electrically conductive.

BRIEF DESCRIPTION OF THE DRAWING

The drawing shows, by way of example, one embodiment of the object of the invention.

DESCRIPTION OF THE PREFERRED EMBODIMENT

Figure 1:
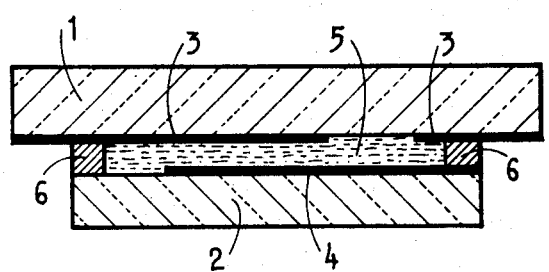
FIG. 1 is a sectional side view of an electro-optic passive display cell, having a liquid crystal, of conventional type.

The display cell represented in FIG. 1 comprises two transparent glass plates, one of which is the front one, designated by 1, and the other one, which is the rear one, is designated by 2. The front plate 1 carries, on its inner face, transparent electrodes and conductive tracks or leads generally designated by 3.

The rear plate 2 carries, innerly, counterelectrodes and conductive tracks or leads generally designated by 4. A liquid crystal 5 is interposed between the two plates 1 and 2 and is retained by a frame 6 made of sintered glass, known as GLASSFRIT.

This cell is obtained by depositing on the two plates 1 and 2 a coating of conductive material, for instance oxide of indium ($In_2O_3$), doped with tin, which is then removed partially by photo-chemical means, so that the coating of conductive material remains only in the places where there must be electrodes and the conductive tracks or leads 3, and 4 respectively.

The index of refraction of the material of the electrodes and of the conductive tracks or leads 3 and 4 respectively, and of the liquid crystal 5 are not the same, and, if one observes the cell through one or the other of the two plates 1 and 2, the electrodes and conductive tracks or leads are visible, even when the cell is at rest, depending on the angle of incidence of the observation.

Figure 2:
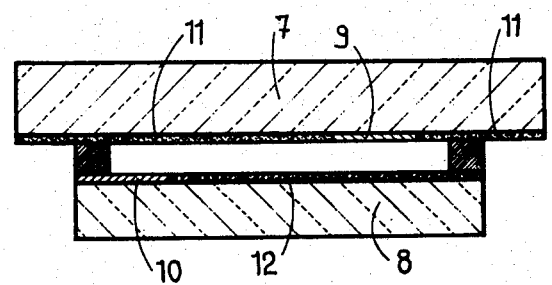
FIG. 2 is a sectional side view of an electro-optic passive display cell, also with a liquid crystal, according to the invention.

In the case of the cell of FIG. 2, which comprises also two transparent glass plates, designated by 7 and 8, one applied on these two plates a coating of metallic oxyde 9 and 10 respectively, for instance an oxide of indium ($In_2O_3$). For realizing or forming the electrodes and conductive tracks or leads, generally designated by 11 for the plate 7 and by 12 for the plate 8, one exposes selected areas of the coatings 9 and 10 to an ion beam of, for instance, ions of tin. This operation of doping renders the coatings 9 and 10 electrically conductive, in the treated areas, without their index of refraction be modified substantially. The rest of the two coatings 9 and 10 remains insulating.

It results from this arrangement that the electrodes or counter-electrodes are not visible when the cell is at rest, whatever may be the angle of incidence of the observation.

As a modification, the coatings 9 and 10 could be realized or formed in an oxide of tin ($SnO_2$) in which case they would be doped by means of ions of antimony.

It is to be noted that the cell could have coated only one of its two transparent plates, the electrodes and conductive tracks or leads of which are a part of the insulating coating, it being understood that this plate will then be the front plate of the cell.

What I claim is:

1. An electro-optic passive display cell comprising, at least one transparent plate having an inner face, a transparent electrically insulating coating applied to said inner face, electrically conductive electrodes and leads formed in said coating by ion implantation, the coating having the same index of refraction and same thickness as said electrodes and leads, the coating being electrically insulating within the cell except in the locations in which said electrodes and leads are formed.

2. A display cell as claimed in claim 1 wherein the electrodes and leads are formed by areas of the coating which are doped.

3. A display cell as claimed in claim 1 wherein the coating is a metallic oxide.

4. A display cell as claimed in claim 3 wherein the coating is an oxide of tin.

5. A display cell as claimed in claim 4 wherein the electrodes and leads are formed by areas of the coating doped with ions of antimony.

6. A display cell as claimed in claim 5 wherein the coating is an oxide of indium.

7. A display cell as claimed in claim 6 wherein the electrodes and leads are formed by areas of the coating doped with ions of tin.

8. Method of manufacturing an electro-optic passive display cell including at least one transparent plate having an inner face and electrically conductive electrodes and leads, said method comprising the steps of, applying a coating of transparent electrically insulating material to said inner face, doping said insulating material by ion implantation in selected areas thereof to form said electrodes and leads, the index of refraction and thickness of the coating being the same as that of the electrodes and leads, the coating electrically insulating within the cell except in the locations in which said electrodes and leads are formed.

9. Method as claimed in claim 8 wherein the coating is in an oxide of tin.

10. Method as claimed in claim 9 wherein the coating is doped with ions of antimony.

11. Method as claimed in claim 8 wherein the coating is an oxide of indium.

12. Method as claimed in claim 11 wherein the coating is doped with ions of tin.

* * * * *

UNITED STATES PATENT AND TRADEMARK OFFICE
CERTIFICATE OF CORRECTION

PATENT NO. :   4,140,372
DATED       :   February 20, 1979
INVENTOR(S) :  ERIC SAURER It is certified that error appears in the above-identified patent and that said Letters Patent are hereby corrected as shown below:

On the Title page, following the filing date block [22] insert the priority information block [30]

--Foreign Application Priority Data

July 9, 1976    Switzerland    8.811/76--

Signed and Sealed this

Twenty-fourth Day of July 1979

[SEAL]

Attest:

LUTRELLE F. PARKER

*Attesting Officer*    *Acting Commissioner of Patents and Trademarks*